United States Patent
Sandstrom et al.

(10) Patent No.: US 8,534,332 B2
(45) Date of Patent: Sep. 17, 2013

(54) TIRE WITH CELLULAR RUBBER TREAD RUNNING SURFACE

(75) Inventors: Paul Harry Sandstrom, Cuyahoga Falls, OH (US); Thomas Charles Lippello, III, Fairlawn, OH (US); Steven Wayne Cronin, Akron, OH (US); Mark Alan Keto, Ravenna, OH (US); Larry Alan Kraus, Uniontown, OH (US); Ping Zhang, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 778 days.

(21) Appl. No.: 12/327,093

(22) Filed: Dec. 3, 2008

(65) Prior Publication Data

US 2010/0132861 A1     Jun. 3, 2010

(51) Int. Cl.
   *C08L 47/00*     (2006.01)
   *B60C 11/00*    (2006.01)

(52) U.S. Cl.
   USPC ......... 152/209.1; 521/140; 152/210; 524/451

(58) Field of Classification Search
   USPC .............. 152/209.1–212, 905; 524/496, 451; 521/140
   See application file for complete search history.

(56) References Cited

U.S. PATENT DOCUMENTS

| | | | | |
|---|---|---|---|---|
| 4,249,588 | A * | 2/1981 | Egan | 152/564 |
| 5,176,831 | A | 1/1993 | Rowsell | 210/631 |
| 5,351,734 | A | 10/1994 | Mouri et al. | 152/209 R |
| 5,429,164 | A * | 7/1995 | Mitsutake | 152/209.7 |
| 5,788,786 | A * | 8/1998 | Yamauchi et al. | 152/209.1 |
| 5,859,115 | A * | 1/1999 | Rennar | 524/492 |
| 6,021,831 | A | 2/2000 | Yamauchi et al. | 152/209.7 |
| 6,497,261 | B1 | 12/2002 | Fukushima et al. | 152/209.4 |
| 7,000,661 | B2 * | 2/2006 | Segatta et al. | 152/170 |
| 7,199,175 | B2 * | 4/2007 | Vasseur | 524/492 |
| 2004/0244894 | A1 * | 12/2004 | Segatta et al. | 152/196 |
| 2010/0065173 | A1 * | 3/2010 | Zhang et al. | 152/209.5 |

OTHER PUBLICATIONS

Science and Technology of Rubber, 1994.*

* cited by examiner

*Primary Examiner* — Robert D. Harlan
(74) *Attorney, Agent, or Firm* — Henry C. Young, Jr.

(57) ABSTRACT

The invention relates to a tire having a tread with a cellular rubber running surface to promote a fast wearing tread running surface designed to expel internally heated tread rubber.

5 Claims, No Drawings

TIRE WITH CELLULAR RUBBER TREAD RUNNING SURFACE

FIELD OF THE INVENTION

The invention relates to a tire having a tread with a cellular rubber running surface to promote a fast wearing tread running surface designed to expel internally heated tread rubber.

BACKGROUND OF THE INVENTION

High performance tires intended to run at high speeds for relatively short distances typically have thin treads which are expected to experience a high rate of internal heat generation.

A challenge is presented to provide such a tread which can dissipate internally generated heat when the tire is run at high speeds.

For this invention, a fast wearing cellular rubber tread is proposed in which such internally generated heat is dissipated by expelling (wearing away, or exfoliating) the tread running surface to both remove heated rubber from the tread at its running surface (to dissipate tread rubber heat buildup) and, also, to thereby reduce the tread volume in which internal heat is generated (to further reduce tread rubber heat buildup).

In order to enhance stability of the cellular rubber tread, an inclusion of a resin as an in situ reaction product of methylene donor and methylene acceptor compounds is provided.

Historically, various tires having a tread of a cellular rubber running surface have been suggested. For example, see U.S. Pat. Nos. 4,249,588, 5,176,831, 5,351,734, 5,788,786, 6,021,831, and 6,497,261.

In the description of this invention, the term "phr" relates to parts by weight for a material or ingredient per 100 parts by weight elastomer(s)". The terms "rubber" and "elastomer" may be used interchangeably unless otherwise indicated. The terms "cure" and "vulcanize" may be used interchangeably unless otherwise indicated.

SUMMARY AND PRACTICE OF THE INVENTION

In accordance with this invention, a tire is provided with a circumferential tread with its running surface comprised of an integral cellular rubber wherein said rubber is a rubber composition comprised of, based upon parts by weight per 100 parts by weight rubber (phr):

(A) at least one conjugated diene-based elastomer, (B) about 20 to about 150, alternately from about 20 to about 90 and further alternately about 35 to about 70, phr of reinforcing filler for said tread rubber composition wherein said reinforcing filler is comprised of:
 (1) about 40 to about 150, alternately from about 40 to about 90 and further alternately about 35 to about 70, phr of particulate, rubber reinforcing carbon black having a DBP (dibutyl phthalate) adsorption value (ASTM D2414) in a range of from about 90 to about 170, alternately from about 90 to about 135, cc/100 g together with an Iodine adsorption value (ASTM D1510) in a range of from about 75 to about 230, alternately from about 75 to about 145, m$^2$/g, and
 (2) optionally from zero up to about 20, alternately from about 5 to about 10, phr of precipitated silica (synthetic amorphous silica), and (C) a resin as a reaction product of a methylene donor compound and a methylene acceptor compound;

wherein said methylene donor compound is comprised of at least one of hexamethylene tetramine, hexamethoxymethylmelamine, hexaethoxymethylmelamine and ethoxymethylpyridinium chloride; and N-methylol derivatives of melamine such as, for example N,N',N"-trimethylolmelamine, N-methylolmelamine and N',N"-dimethhylolmelamine, preferably comprised of at least one of hexamethylene tetramine and hexamethoxymethylmelamine; and wherein said methylene acceptor compound is comprised of at least one of phenolic cashew nut oil resin, resorcinol, resorcinol monobenzoate and polyhydric phenoxy resin, and reactive phenol formaldehyde resin, preferably comprised of reactive phenol formaldehyde resin (reactive with said methylene donor compound).

If desired, the precipitated silica, if used, may be accompanied with a coupling agent having a moiety reactive with hydroxyl groups on said precipitated silica and another different moiety interactive with carbon-to-carbon double bonds of said diene-based elastomer to enhance a rubber reinforcing effect of the precipitated silica.

However, such inclusion of a coupling agent is preferably not desired in order to limit the rubber reinforcing ability of the silica and to thereby promote a fast wearing of the tread running surface. In other words, it is preferred that the precipitated silica is used without (e.g. is used exclusive of) a coupling agent.

Exemplary of resin products of methylene donor and methylene acceptor for rubber compositions may be found, for example, U.S. Pat. Nos. 5,206,289 and 4,605,696.

In practice, said tread is a thin tread desirably having a maximum thickness of about 12, alternately about 4, mm (millimeters). Its thickness may range, for example, from about 1.2 mm to about 12, alternately from about 1.2 to about 4, mm. Accordingly, with such a thin tread, expelling of rubber from its tread running surface can have a significant effect upon removing internally heated rubber from the tread itself.

A significant aspect of this invention is that it has been observed that a fast wearing tire tread having enhanced stability is provided by the inclusion in the rubber composition with the associated particulate reinforcement of said resin product of methylene donor and methylene acceptor compounds, a facet of the invention resulting from experimental ascertation.

This is considered herein to be a significant departure from past practice in a sense of providing a high performance tread with a means of reducing its heat build up by exfoliating its running surface as the tire is being run.

In practice, said inclusion of the resin product is a significant portion of the cellular rubber for the tire tread in a sense of being intended to regain stiffness (dimensional stability) of the tread rubber running surface lost by alternatively providing the tread running surface in a form of a cellular rubber. For such purpose, it is desired to provide the cellular rubber with a storage modulus (G') comparable to a comparative solid tread rubber.

In the practice of this invention, the tread of the tire may be a rubber composition comprised of various conjugated diene based elastomers. Such diene-based elastomers may be comprised of at least one of polymers and copolymers of conjugated dienes, such as, for example, isoprene and 1,3-butadiene, and copolymers of vinyl aromatic compound selected from styrene and alphamethyl styrene, preferably styrene and at least one conjugated diene such as, for example, isoprene and 1,3-butadiene.

Representative examples of said elastomers may be, for example, cis 1,4-polyisoprene rubber (natural and synthetic), cis 1,4-polybutadiene rubber, vinyl polybutadiene rubber having a vinyl 1,2 content in a range of about 20 percent to about 90 percent, styrene/butadiene copolymer (SBR) rubber (aqueous emulsion or organic solution polymerization prepared copolymers) and including organic solvent polymerization prepared SBR having a vinyl 1,2-content in a range of about 20 to about 90 percent based on its polybutadiene derived portion and a bound styrene content in a range of about 10 to about 60 percent based upon the copolymer, styrene/isoprene/butadiene terpolymer rubber, butadiene/acrylonitrile rubber, styrene/isoprene copolymer and isoprene/butadiene copolymer rubber, 3,4-polyisoprene rubber and trans 1,4-polybutadiene rubber.

In one aspect, the conjugated diene-based elastomer may be comprised of natural cis 1,4-polyisoprene rubber.

Particulate reinforcement for the cellular tread rubber is contemplated as being (e.g. as being comprised of) rubber reinforcing carbon black. Generally, the reinforcement does not include (is preferably exclusive of, or exclusive of any appreciable amount of) silica (e.g. precipitated silica).

As hereinbefore mentioned, the rubber reinforcing carbon black may be contained in the cellular rubber composition (and therefore in the cellular rubber precursor rubber composition) in an amount of, for example, from about 40 to about 150, alternately from about 40 to about 90, phr depending somewhat upon the degree of rubber reinforcement desired as well as the choice of rubber reinforcing carbon black.

Representative examples of the aforesaid rubber reinforcing carbon blacks are found in *The Vanderbilt Rubber Handbook,* 1978, Page 417, including their ASTM designations.

As previously discussed, the rubber reinforcing carbon black may, for example, have a DBP (dibutyl phthalate) adsorption value in a range of from about 90 to about 170 (alternately about 90 to about 135) cc/100 g together with an Iodine adsorption value in a range of from about 75 to about 230 (alternately from about 75 to about 145) $m^2/g$.

The cellular rubber is co-vulcanized with the tire in order to be integral with the rubber tire construction. It is built, for example, as a solid, unvulcanized layer containing a temperature activated blowing agent onto the outer portion of the green, unvulcanized tire, generally over a building drum. The constructed tire is then shaped, molded, heated and vulcanized under pressure. The shaping pressure is generally supplied by a shaping bladder positioned within the tire to press and shape it outwardly against the mold. The closed cell structure itself is formed by elevated temperature activation of said blowing agent during the vulcanization process to essentially or practically simultaneously form the cellular structure of the rubber tread. Typical vulcanization temperatures may range, for example, from about 150° C. to about 180° C. Thus, the cellular rubber forms substantially simultaneously with the co-vulcanization step to enhance the integral tire tread aspect of the tire.

The cellular rubber tread is thereby integral in a sense of being co-vulcanized with the rubber tire rather than being a simple laminate.

Blowing agents used in the practice of this invention for the formation of the cellular rubber are compounds which liberate gases upon heating to an elevated temperature and cause the formation of the integral closed cell rubber. Representative examples of various gases are, for example, nitrogen and carbon dioxide. For example ammonium bicarbonate and sodium bicarbonate can release carbon dioxide, although usually compounds which liberate nitrogen are preferred. Such blowing agents are compounds which give off gases upon being triggered at or near the vulcanization temperatures, representative of which are, for example nitro, sulfonyl and azo compounds such as, for example, dinitrosopentamethylene tetramine, N,N'-dimethyl-N,N'-dinitrosophthalamide, azodicarbonamide, N,N'-dinitrosopentamethylene tetramine, sulfonyl hydrazides such as benzenesulfonyl hydrazide, toluene-sulfonyl hydrazide and p,p'-oxy-bis-(benzenesulfonyl)hydrazide and sulfonyl semicarbazides such as p-toluene sulfonyl semicarbazide, p,p'-oxy-bis-(benzenesulfonyl semicarbazide) and diphenyloxide-4,4'-disulphenyldrazide.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins and plasticizers, pigments, fatty acid, zinc oxide, waxes, antioxidants and antiozonants, and peptizing agents. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention, unless otherwise indicated herein.

The tires can be built, shaped, molded and cured by various methods which will be readily apparent to those having skill in such art.

The following example is presented in order to illustrate but not limit the present invention. The parts and percentages are by weight unless otherwise indicated.

EXAMPLE I

Samples of rubber compounds (rubber compositions) were prepared to answer the challenge of providing a fast wearing tire tread which also provides suitable performance.

For such challenge, rubber Samples were prepared to evaluate an effect of forming a closed cellular foam rubber for a fast wearing tire tread running surface which contains an inclusion of a resin caused by in situ reaction of a methylene acceptor compound comprised of a reactive phenol formaldehyde resin with a methylene donor compound comprised of hexamethoxymethylmelamine to promote stiffness, and thereby tire tread performance for the cellular rubber.

Rubber Sample A is a non cellular Control (comparative) rubber sample.

Rubber Samples B through F are Experimental closed cellular rubber Samples.

Rubber Samples D, E and F contained a resin as an in situ reaction product of a combination of said methylene donor and methylene acceptor compound.

The following Table 1 is illustrative of the respective rubber Samples (rubber compositions). The parts and percentages (rounded) are presented in terms of weight unless otherwise indicated.

The materials may be mixed in a sequential two-step mixing process, namely a non-productive mixing step, followed by a productive mixing step in an internal rubber mixer, in which all of the ingredients, except for sulfur, sulfur cure accelerators, blowing agent and HMMM, or hexamethoxymethylmelamine, as a methylene donor, are mixed in the first, non-productive mixing step and the sulfur, sulfur cure accelerators, blowing agent and methylene donor are added in the subsequent productive mixing step in an internal rubber mixer. The rubber mixtures are dumped from the respective rubber mixer steps and cooled to below 40° C. between mixing steps. Such sequential procedural non-productive and productive rubber mixing steps are well known to those having skill in such art.

without the resin inclusion presented a desirably worse abrasion resistance (greater rate of rubber was abraded away) as compared to Experimental foam rubber Sample B (and Con-

TABLE 1

|  | Control | Experiments | | | | |
|---|---|---|---|---|---|---|
|  | A | B | C | D | E | F |
| Non-Productive Mixing Step (NP) | | | | | | |
| Natural cis 1,4-polyisoprene rubber[1] | 90 | 90 | 90 | 90 | 90 | 90 |
| Styrene/butadiene (SBR) rubber[2] | 10 | 10 | 10 | 10 | 10 | 10 |
| Rubber reinforcing carbon black N330[3] | 63 | 63 | 63 | 63 | 63 | 63 |
| Phenol formaldehyde reactive resin (acceptor)[4] | 0 | 0 | 0 | 3 | 3 | 3 |
| Antioxidant[5] | 1.2 | 1.2 | 1.2 | 1.2 | 1.2 | 1.2 |
| Processing oil (added rubber processing oil) | 9 | 9 | 9 | 9 | 9 | 9 |
| Zinc oxide | 5 | 5 | 5 | 5 | 5 | 5 |
| Fatty acid[6] | 2 | 2 | 2 | 2 | 2 | 2 |
| Productive Mixing Step (P) | | | | | | |
| Sulfur | 0.8 | 0.8 | 0.8 | 0.8 | 0.8 | 0.8 |
| Sulfur cure accelerators[7] | 2.8 | 2.8 | 2.8 | 2.8 | 2.8 | 2.8 |
| Hexamethoxymethylmelamine (HMMM), (donor) | 0 | 0 | 0 | 4 | 4 | 4 |
| Blowing agent[8] | 0 | 10 | 15 | 5 | 10 | 15 |

[1]Natural cis 1,4-polyisoprene rubber (SMR-20)
[2]Emulsion polymerization prepared styrene/butadiene rubber (E-SBR) containing about 23 percent bound styrene as PLF1712C from The Goodyear Tire & Rubber Company as an oil extended rubber (13.75 phr) containing 3.75 parts of rubber processing oil and reported in the Table in terms of the rubber itself (10 phr)
[3]Rubber reinforcing carbon black as N330, an ASTM designation
[4]Phenol formaldehyde resin, reactive, as Alnovol ™ PN350 from Cytec Surface Specialities
[5]Amine based rubber antioxidant
[6]Fatty acid comprised of stearic acid, palmitic acid and oleic acid
[7]Thiocarbamate and benzothiazole type sulfur vulcanization accelerators
[8]Composite of blowing agent as diphenyloxide-4,4'-disulphenylhydrazide and a polymeric binder in a 75/25 weight ratio thereof as Akrosperse ™ BBSH-75-EPR-S from Akrochem. The composite is therefore 75 percent active insofar as the blowing agent is concerned.

The following Table 2 reports physical data for various physical properties of the Samples. Control rubber Sample A is a solid rubber sample. Experimental rubber Samples B through F are closed cellular rubber samples caused by temperature activation of the blowing agent within the rubber composition. The parts and percentages are by weight unless otherwise indicated.

trol solid rubber Sample A), its stiffness (e.g. dimensional stability) was undesirably reduced as indicated by the reduced Storage modulus (G'), particularly at 1 percent strain.

While Experimental foam rubber Sample D, which contained only 5 phr of the blowing agent composite but which contained 7 phr of the in situ formed resin, presented a desirably worse abrasion resistance (somewhat greater rate of

TABLE 2

|  | Control | Experiments | | | | |
|---|---|---|---|---|---|---|
|  | A | B | C | D | E | F |
| Blowing agent composite (75% active) (phr) | 0 | 10 | 15 | 5 | 10 | 15 |
| Reinforcing resin (phr) (by in situ reaction of said phenol formaldehyde as a methylene acceptor and HMMM as a methylene donor) RPA[1], (100° C., 1 hz) | 0 | 0 | 0 | 7 | 7 | 7 |
| Storage modulus G' (1% strain), MPa | 2.9 | 1.9 | 1.6 | 3.3 | 2.5 | 1.8 |
| Storage modulus G' (10% strain), MPa | 1.7 | 1.1 | 0.9 | 1.6 | 1.2 | 1 |
| Loss compliance J'' (40% strain), MPa | 0.07 | 0.24 | 0.34 | 0.18 | 0.34 | 0.47 |
| DIN abrasion (relative rubber abraded away)[2] | 136 | 173 | 305 | 157 | 220 | 294 |

[1]Rubber Process Analyzer (RPA)
[2]ASTM D53516

From Table 2 it is observed that Experimental foam rubber Sample B, with 10 parts of blowing agent composite and without the resin inclusion, while presenting a desirably worse abrasion resistance (greater rate of rubber abraded away) as compared to Control solid rubber Sample A, its stiffness (e.g. dimensional stability) was undesirably reduced as indicated by the reduced Storage modulus (G'), particularly at 1 percent strain.

While Experimental foam rubber Sample C with an increased amount of 15 parts of blowing agent composite and rubber abraded away) as compared to Control solid rubber Sample A, its stiffness (e.g. dimensional stability) was desirably increased as indicated by the increased Storage modulus (G'), particularly at 1 percent strain.

While, Experimental foam rubber Sample E, which contained double the amount of the blowing agent composite (10 phr), as compared to Experimental rubber Sample D, and also contained a comparable 7 phr of the in situ formed resin presented a desirably worse abrasion resistance (greater rate of rubber abraded away) as compared to Experimental foam rubber Sample B, its stiffness (e.g. dimensional stability) was desirably increased as indicated by the increased Storage modulus (G'), particularly at 1 percent strain.

Lastly, Experimental foam rubber Sample F, which contained an increase to 15 phr of the blowing agent composite and also contained 7 phr of the in situ formed resin, presented a desirably worse abrasion resistance (greater rate of rubber abraded away) as compared to Experimental foam rubber Samples D and E (as well as Control solid rubber Sample A). However its stiffness (e.g. dimensional stability) was undesirably decreased as indicated by the decreased Storage modulus (G'), particularly at 1 percent strain.

Accordingly, it is considered herein that a tire having a cellular rubber tread of the rubber composition of Sample D or Sample E which contained 5 or 10 phr, respectively, of the blowing agent composite (about 3.75 or 7.5 phr, respectively, of the blowing agent itself) for the cellular rubber precursor can be provided to promote a fast wearing cellular rubber tread running surface designed to expel internally heated tread rubber and which has dimensional stability (Storage modulus G' at a 1 percent strain) promoted by an inclusion of 7 phr of the said resin in the rubber composition (the in situ reaction product of methylene acceptor and methylene donor compounds where the methylene acceptor compound is comprised of reactive phenol formaldehyde resin and the methylene donor compound is comprised of hexamethoxymethylmelamine).

A preferred operating range of blowing agent composite in the precursor rubber composition is from about 3 to about 12 phr (from about 2.3 to about 9 phr of the blowing agent itself) combined with a preferred resin content range of about 3 to about 11 phr, where the ratio of methylene donor to methylene acceptor for the resin is from about 2/1 to about 1/2.

While certain representative embodiments and details have been shown for the purpose of illustrating the invention, it will be apparent to those skilled in this art that various changes and modifications may be made therein without departing from the spirit or scope of the invention.

What is claimed is:

1. A tire with a circumferential tread with its outer running surface being comprised of a thin exfoliation heat dissipating integral resin stiffening cellular rubber co-vulcanized and integral with the tire, where the cellular rubber has a thickness in a range of from about 1.2 mm to about 4 mm wherein said rubber of said cellular rubber is a rubber composition comprised of, based upon parts by weight per 100 parts by weight rubber (phr):
   (A) conjugated diene-based elastomer consisting of at least one cis 1,4-polyisopene, cis 1,4-polybutadiene and copolymers of styrene with isoprene or 1,3-butadiene,
   (B) about 20 to about 150 phr of reinforcing filler for said tread rubber composition wherein said reinforcing filler is comprised of:
      (1) about 40 to about 150 phr of particulate, rubber reinforcing carbon black having a DBP (dibutyl phthalate) adsorption value (ASTM D2414) in a range of from about 90 to about 170 cc/100 g together with an Iodine adsorption value (ASTM D1510) in a range of from about 75 to about 230 $m^2/g$, and
      (2) optionally from zero up to about 20 phr of precipitated silica, and
   (C) cellular rubber containing a stiffness promoting resin as a reaction product of a methylene donor compound and a methylene acceptor compound;
   wherein said methylene donor compound is comprised of hexamethoxymethylmelamine; and
   wherein said methylene acceptor compound is comprised of at least one of phenolic cashew nut oil resin and reactive phenol formaldehyde resin
   wherein said resin is present in said cellular rubber composition an amount of from about 3 to about 11 phr and wherein the ratio of methylene donor to methylene acceptor for the said resin is in a range of from about 2/1 to about ½.

2. The tire of claim 1 where said rubber composition contains precipitated silica in an amount of up to about 20 phr without a coupling agent for the silica.

3. The tire of claim 1 wherein said methylene acceptor is a reactive phenol formaldehyde resin.

4. The tire of claim 1 wherein diene-based elastomer is natural cis 1, 4-polyisoprene rubber.

5. The rubber composition of claim 1 wherein said reinforcing filler consists of rubber reinforcing carbon black.

* * * * *